United States Patent [19]

Napadow

[11] Patent Number: 4,700,615
[45] Date of Patent: Oct. 20, 1987

[54] SPRAY BOOTH

[75] Inventor: Stanley C. Napadow, Elgin, Ill.

[73] Assignee: Protectaire Systems Co., Elgin, Ill.

[21] Appl. No.: 816,144

[22] Filed: Jan. 3, 1986

[51] Int. Cl.[4] .............................................. B05B 15/12
[52] U.S. Cl. ..................................... 98/115.2; 55/241;
55/DIG. 46; 98/36
[58] Field of Search ........... 55/241, 257 PV, 257 QV, 55/DIG. 46, 226; 98/36, 115.2; 118/326, DIG. 7

[56] References Cited

U.S. PATENT DOCUMENTS

| | | | |
|---|---|---|---|
| 2,132,826 | 10/1938 | Ludwig | 98/115.2 |
| 3,387,551 | 6/1968 | Hughes | 98/115.2 |
| 3,391,630 | 7/1968 | Wilhelmsson | 98/115.2 |
| 3,516,230 | 6/1970 | Saubesty | 98/115.2 X |
| 4,345,921 | 8/1982 | Gustavsson et al. | 98/115.2 X |
| 4,350,506 | 9/1982 | Otto | 55/241 |
| 4,521,227 | 6/1985 | Gerdes et al. | 98/115.2 X |
| 4,608,064 | 8/1986 | Napadow | 98/115.2 X |

FOREIGN PATENT DOCUMENTS

| | | | |
|---|---|---|---|
| 533403 | 10/1976 | U.S.S.R. | 118/326 |
| 975111 | 11/1982 | U.S.S.R. | 118/326 |

Primary Examiner—Harold Joyce
Attorney, Agent, or Firm—Fitch, Even, Tabin & Flannery

[57] ABSTRACT

A spray booth includes an air cleaning apparatus providing an air intake beneath its floor, and provides air curtains along the interior surfaces of its side walls. The preferred air cleaning apparatus provides a first slot and water curtain through which air flows with the air velocity increased in the slot and then slowed down in a larger volume separation chamber. The direction of air and water flow are reversed several additional times with the air flowing through several additional water curtains. The water and air are discharged into a large precipitation chamber in which the water is collected and the air velocity is reduced very substantially before discharge through an air exhaust duct.

23 Claims, 4 Drawing Figures

SPRAY BOOTH

BACKGROUND OF THE INVENTION

The invention relates to a spray booth of the type wherein air flows through the booth and water washes remove particulate matter from the air.

Booths of the type to which the present invention relates are frequently used in spray painting operations wherein an article to be painted is transported through the booth on a conveyor and is spray painted either by hand-held spray nozzles aimed and operated by workers within the booth or by automatic spraying equipment. It is desirable that such booths be suitable for spraying of articles of different shapes and sizes, and suitable for spraying from various directions and locations within the booth.

To provide an even coating on an article being sprayed, it is desirable that only paint particles striking the article directly from a nozzle adhere thereto. It is undesirable that particles deflected from the article be permitted to settle on the article. To these ends, and to supply clean air for workers to breathe, air flows downwardly through the booth at a predetermined rate. The air flow removes particulate material from the booth to prevent undesirable adherence thereof to the workers, to the articles being sprayed, or to other objects within the booth. Certain minimum air flow rates may be needed to supply clean air for workers to breathe for compliance with occupational safety and health standards.

One problem associated with operation of spray booths is that air which is received beneath the floor of the booth after having passed downward through the booth interior typically is laden with a relatively high concentration of particulate matter which must be separated from the air. Discharge of particle-laden air is generally undesirable for environmental reasons, and emission standards presently applicable to many industrial operations specify maximum concentrations of particulate matter for spray booth emissions. In the past, various air-cleaning systems have been proposed to reduce the particle content of spray booth emissions, but such systems have generally been incapable of meeting the above-referenced standards. There is a continuing need for improved means for reducing the concentrations of particulate matter in spray booth emissions.

Another problem associated with operation of some paint spray booths is adherence of particulate matter to the interiors of the side walls of the booths. It is desirable to maintain the interiors of the walls reasonably clean. Also, in booths where windows are provided in the side walls to enable illumination of the interior of the booth from outside the booth, it is desirable to prevent particles from adhering to the interiors of the windows. Thus there is a need for means to prevent build-up of particulate matter on the interior surfaces of booth side walls.

Other considerations which influence the design of spray booths include economy of operation and noise level, which are somewhat interrelated. In industrial spray painting of automobile bodies and the like, it is generally desirable that the power required for pulling air downwardly through a spray booth and through air cleaning apparatus beneath the booth not exceed a predetermined value. Also, it is generally desirable that the noise level inside the booth and around the booth be relatively low. The noise level is partially dependent on the power of the equipment used for moving air through the booth, and dependent on other considerations as well, including air velocity and the configuration of the air cleaning equipment beneath the booth.

Accordingly, it is a general object of the invention to provide a spray booth which is suitable for use in industrial operation and which includes improved apparatus for removing particulate matter from air beneath the booth. It is an additional object of the invention to provide a spray booth having improved means for preventing or reducing adherence of particles to interior wall surfaces of the booth. Additional objects and advantages of the invention are set forth below.

SUMMARY OF THE INVENTION

In accordance with the invention, a spray booth includes improved air cleaning apparatus which is capable of removing particulate matter from air flowing therethrough. The air cleaning apparatus preferably comprises a pair of air cleaning units, one extending along each side of the booth, providing dual air intakes beneath the booth floor.

The booth further includes means for providing air curtains along the interiors of the side walls of the booth to reduce adherence of particles thereto. Each of the air curtains is preferably produced by passing air through a relatively narrow slot extending the length of the booth adjacent the upper extremity of each side wall.

DETAILED DESCRIPTION OF PREFERRED EMBODIMENTS

The invention is preferably embodied in a spray booth which provides an enclosure for containing paint or other material during a spraying operation. While the apparatus is described herein in connection with a spray painting operation, the usefulness of the apparatus of the invention is not limited to painting operations, but may extend to various other types of operations as well.

Figure 1:
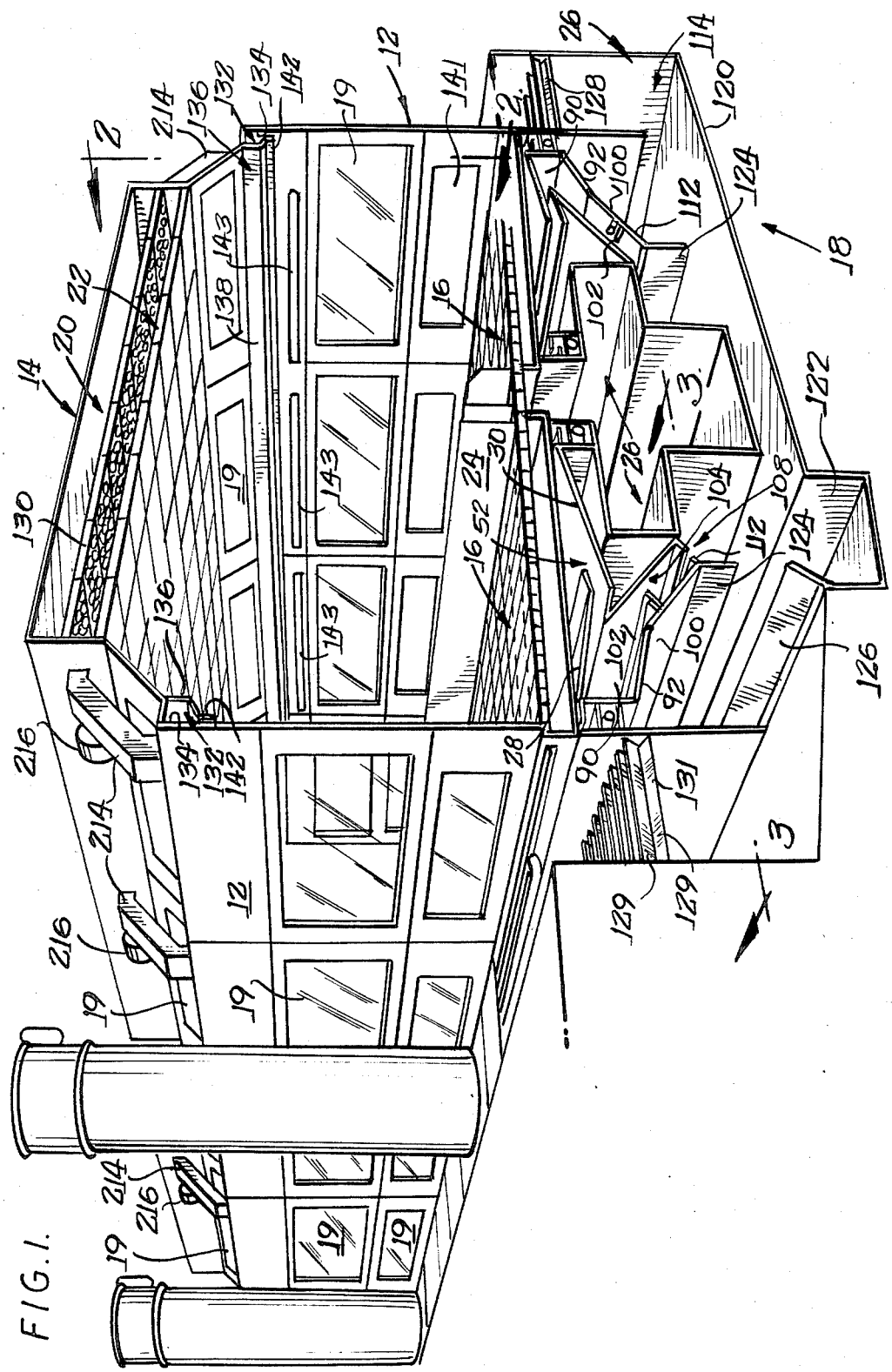
FIG. 1 is a perspective view of a spray booth in accordance with a first embodiment of the invention, with portions broken away for clarity.

Referring to FIG. 1, the illustrated booth 10 includes a pair of upstanding side walls 12 supporting a roof assembly 14. In the illustrated booth 10, the roof assembly 14 includes means defining a plenum 20 for air, and includes an air permeable ceiling assembly 22. A permeable floor 16 extends between the side walls 12.

A blower 23 draws air downwardly from the plenum 20 through the ceiling assembly 22 and through the booth interior, carrying paint particles or the like downwardly through the floor 16 of the booth 10 to air cleaning apparatus 18. A conveyor means having a track 24 extends longitudinally of the booth for transporting through the booth objects to be painted. To permit the interior of the booth 10 to be illuminated by exterior light sources, transparent window panels 19 are provided in the side walls 12 and roof assembly 14.

In a typical spray painting operation, a number of nozzles spray particles of paint at an object such as an automobile body at relatively high velocity. Although most of the paint adheres to the surface of the object being painted, a relatively large percentage, which may approach 50%, of the paint particles generally either are deflected from the surface or never reach the surface. Such particles are generally very light, and may become suspended in the air within the booth. As the air is drawn downwardly, the particles travel downwardly with the air. Because of the very large volume of paint being sprayed in these booths, reductions in removal efficiency, although small in number, for example from 99.96% to 99.98%, are commercially very significant in the amount of paint particles discharged in a 24-hour period. It is desirable that substantially all of the particles be removed from the air so that the air can be discharged to the atmosphere or recycled through the booth.

In the past, various types of structures have been employed to wet particles in air as it is drawn through air cleaning apparatus by directing the air through water curtains or washes. Wetting of the particles increases their weight, thereby increasing the tendency of the particles to drop out of the air as it proceeds through the cleaning apparatus. Air flow patterns in some prior art spray booths include streams of high velocity air which carry particles entirely through the air cleaning apparatus without the particles being wetted.

One object of the present invention is to provide a new and improved spray booth to increase the percentage of particles that are wetted and removed from the air.

In accordance with one feature of the present invention, the cleaning apparatus 18 includes water that is directed in reverse directions to form water curtains through which the air must pass and air flow slots and deflecting walls to cause the air and water to mix turbulently and wet particulates. Also, the air flows through several expansion chambers in which the air velocity is substantially reduced to precipitate the wetted paint particles from the air stream. In accordance with a second feature of the invention, means are provided to generate air curtains along the interiors of the side walls 12 of the booth to prevent adherence of paint particles to the walls 12 and windows 19 therein.

Figure 3:
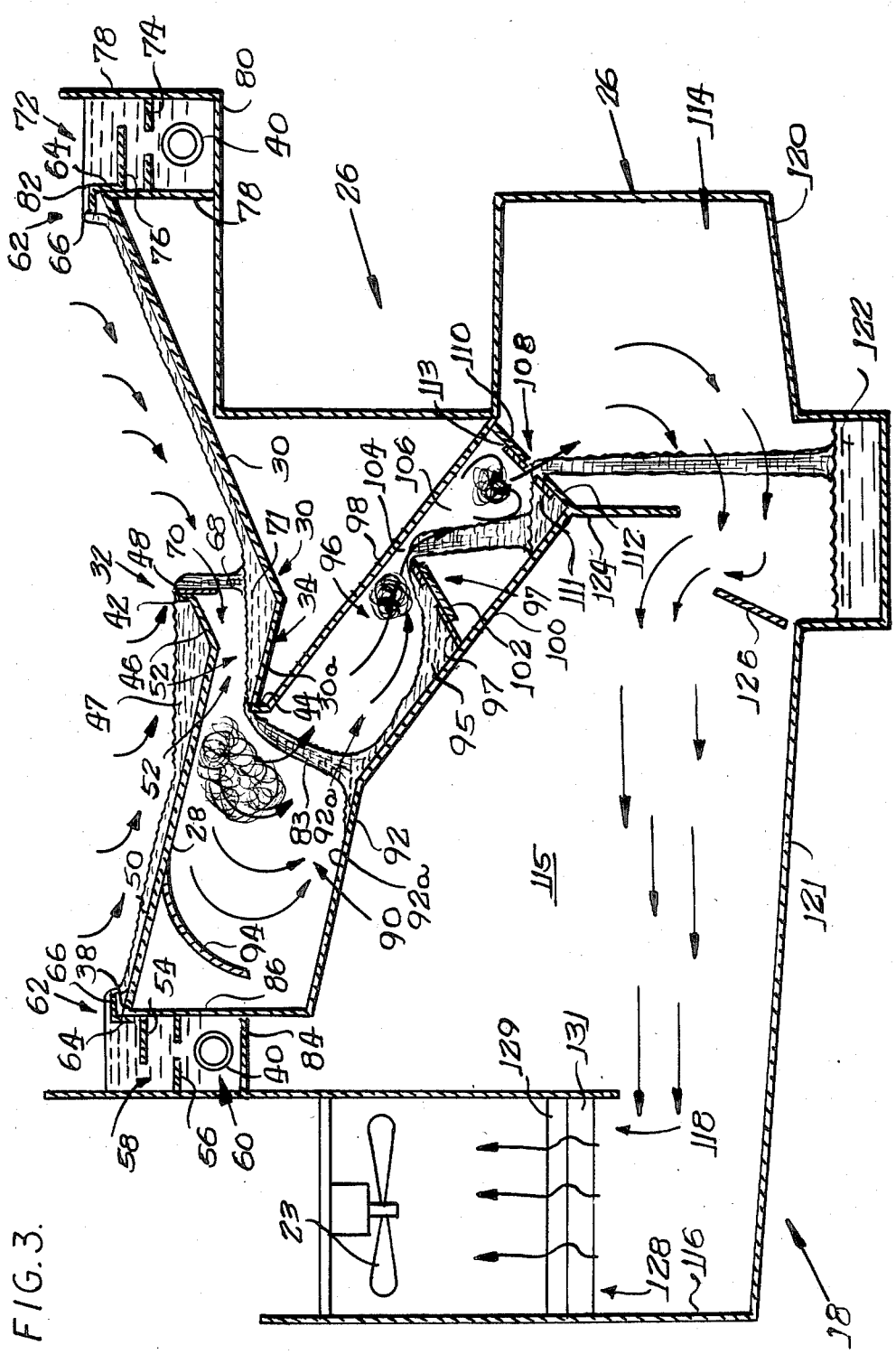
FIG. 3 is an enlarged sectional view of air cleaning apparatus in accordance with a first embodiment of the invention, taken substantially along line 3—3 in FIG. 1 and looking in the direction of the arrows.

Turning to a more detailed description of the air cleaning apparatus of FIGS. 1 and 3, the air cleaning units 26 are preferably shown disposed symmetrically on each side of the center of the booth 10. The units 26 are mirror images of each other, and only one will be described in detail herein.

Referring particularly to FIG. 3, there is provided an illustration of one of the cleaning units 26 and the flow of air and water therethrough are diagrammatically indicated. Upper and lower subfloor members 28 and 30 slope generally downwardly toward one another, and each includes means 32, 34 to provide for retention of water near its lower edge 42, 44. The means 32 for retention of a water pool 45 near the lower edge 42 of the upper member 28 includes an upturned portion 46 and a weir 48 extending along the lower edge 42.

The lower member 30 extends partially beneath the upper member 28 so as to define a generally horizontal air intake 52 therebetween. During operation, particle-laden air flows downward toward the subfloor members, then turns to flow along the subfloor members and through the intake 52. A portion of the particles in the air, particularly larger, heavier particles, drop from the air before the intake 52. Because the intake is oriented generally horizontally, particles cannot fall down through the intake by gravity alone as in some booths. This provides an advantage over air cleaning apparatus having vertical intakes.

Air is wetted as it enters the intake 52 by a curtain of water 68 flowing downwardly from the upper subfloor member 28. Flow of water over the upper subfloor member 28 is effected by provision of an elongated reservoir 36 extending along the upper edge 38 thereof and a water supply pipe 40 which provides steady inflow of water into the reservoir 36. Water continuously overflows the reservoir 36 to flow over the upper edge 38 of the upper subfloor member 28, down the upper surface 50 thereof, and over the lower edge 42 and weir 48. The upper surface 50 is thus substantially covered by a moving sheet of water which continuously removes particulate matter therefrom.

To prevent variations in pressure along the length of the supply pipe from leading to discontinuities in flow over the upper subfloor member 28, and to ensure smooth and evenly distributed outflow from the reservoir 36, horizontal baffles 54, 56 are provided above the supply pipe 40. The uppermost baffle 54 extends away from the upper subfloor member 28 to define a slot 58 at its distal edge. The lower baffle 56 spans the width of the reservoir 36 and has a plurality of perforations formed therethrough for upward flow of water. The lower baffle 56 essentially defines a plenum 60 therebeneath to distribute flow evenly along the length of the reservoir 36. The reservoir 36 has a substantially rectangular cross-section, and is defined by a substantially horizontal bottom wall 84 extending between a pair of substantially vertical walls 86 and 88.

It is most desirable that there be a continuous flow of water along the longitudinal length of the reservoir 36 and across the entire surface of the upper subfloor member 28; and to this end, there is provided an adjustable weir 62 at the upper edge 38 of the subfloor member 28. The adjustable weir 62 is preferably made of angle irons comprising substantially vertical webs 64 extending upward from the wall 86 on which the weir 62 is mounted and to which the weir is fastened by fasteners (not shown) and substantially horizontal webs 66 extending partially over the subfloor member 28. The weir 62 is preferably made up of a plurality of independently adjustable lengths of angle iron so that the height of a particular portion can be adjusted by loosening its fasteners to compensate for nonuniformity in flow rate.

The weir 48 is adjustable vertically by fasteners (not shown) fastening the weir to lip edge 42 of the subfloor member 28. The weir 48 is broken into separate sections each of which can be adjusted vertically in height to develop a large pool 47 of water behind the weir. The large pool of water assures that even with variations of water flow down the sheet that there will be ample water flowing across the weir's top edge to provide a continuous, uninterrupted water curtain 68 flow across the slot formed beneath the weir. Approximately 20 gallons of water per lineal foot flow over the weir from the pool 47 into the underlying pool 71. Thus, there are no unwetted surfaces on the subfloor member 28 or the weir 48 and hence, there are no dry areas or discontinuities in the wetted surface along the longitudinal length of the weir 48.

To provide for flow of water from the upper edge of the lower subfloor member 30 to its lower edge, a reservoir 72 similar to that described above in connection with the upper subfloor member 28 is provided at the upper edge of the lower subfloor member 30. This reservoir 72 is essentially a mirror image of the first-described reservoir 36, including a lower baffle 74 and an upper baffle 76 extending generally horizontally between a pair of vertical side walls 78 which extend upward from a generally horizontal bottom wall 80. An adjustable weir 82 is provided along the upper edge of the lower subfloor member to function in substantially the same manner as the above-described adjustable weir 62. The flow of water over the lower edge of the lower subfloor member 30 provides a second water curtain 83. The subfloor 30 has an upturned edge 30a to form the large longitudinally extending pool 71 of water to assure that there are no discontinuities in the wetted surface along the edge 44 across which water continuously flows at a rate, e.g. of 15 gallons per lineal foot.

As noted above, water flowing over the weir 48 at the lower edge 42 of the upper subfloor member forms a first water curtain 68 in the path of particle-laden air entering the intake 52. The water curtain 68 wets a substantial portion of the particulate matter in the air entering the intake 52. The lower edge of the weir 48 defines a slot 70 at the entrance to the intake 52. The velocity of the air flowing into the intake 52 across the bottom edge of the weir 48 is relatively high, and accordingly, a portion of the water in the curtain 68 is drawn into the intake 52, is carried entirely therethrough by the air, and emerges as a spray or mist. Another portion flows down into the pool 71 at the lower edge of the lower member 30.

Water flowing over the upper edge of the weir 48 flows downwardly along the side of over the weir and enters the intake slot 70 from above with a predetermined vertical velocity component. As the water flows across and into the slot 70, it begins to mix with air flowing into the slot 70 and to wet particulate matter in the air. The flow immediately downstream of the slot 70 is highly turbulent and effects mixing of air and water to wet a further percentage of the particles in the air. Provision of a water curtain having a small vertical dimension at the slot 70 enables a high percentage of particulate matter to be wetted at this point. Some such wetted particulate matter drops into the pool 71, and other wetted particulates are carried through the intake 52 and drop out downwstream therefrom.

For a given flow rate, decreasing the width of the slot 70 increases the average flow velocity of the slot and decreases the vertical dimension of the first water curtain 68. Generally, a high flow velocity through the slot provides good mixing and accordingly good wetting downstream of the slot 70. However, high velocity through the intake slot results in high noise levels in the booth, and narrowing the slot also increases the pressure gradient across the slot, increasing power requirements for the air cleaning apparatus. Thus, it may be desirable to maintain a slot width which provides less than optimal wetting performance in order to comply with other constraints. The achievement of highly effective air cleaning in the apparatus of FIGS. 1 and 3 at acceptable noise levels and with acceptable power consumption is due in part to the provision of dual air intakes 52 as shown in FIG. 1, whereby each air intake 52 handles only one-half the flow volume handled by single intakes in prior art booths. Also, the air flow through the first water wash has changed its direction of flow from vertical to substantially horizontal which aids in creating turbulence at the intake 52.

In a typical industrial spray painting operation, an air flow rate of about 2,000 cubic feet per minute per foot of booth length is maintained. In the apparatus of FIGS. 1 and 3, provision of dual air intakes 52 enables a flow rate of about 1,000 cubic feet per minute per foot of booth length to be maintained for each air intake 52. When a four inch slot 70 is provided at the entrance to each intake 52, the average velocity in the slot is about 4,000 feet per minute.

After flowing through the intake 52, air enters a relatively large precipitation chamber 90 defined between the upper subfloor member 28 and an inclined bottom wall 92 disposed therebeneath and substantially parallel thereto. The subfloor member 28 and bottom wall 92 are connected by the vertical wall 86. Provision of the large chamber 90 at this point decelerates the air emerging from the intake 52, causing a substantial portion of the wetted particles to drop out. For example, the deceleration may be from about 4000 fpm at entry to about 800 fpm for the exit velocity from the precipitation chamber 90. This sudden drop in velocity causes wetted particles to drop out of the air stream. As air enters this chamber 90, it has a relatively high horizontal velocity component directed toward the left of FIG. 3 and a relatively small, downwardly directed vertical velocity component. Its horizontal velocity component reverses direction in the chamber 90, and the air flows downwardly and to the right. This change in flow direction augments the gravitational force in removal of relatively heavy wetted particles, and a substantial percentage of such particles impact the bottom wall 92 of the chamber where they become entrained in the water 92a flowing downardly therealong. Because the bottom wall 92 is covered with water, paint doesn't stick to it but is carried away by the water flowing along and covering the top surface of the bottom wall 92.

To prevent buildup of particles on the vertical wall 86, a sloping deflector 94 extends downwardly from the upper subfloor member 28, deflecting flow downward. The deflector 94 is preferably curved so that its slope increases, proceeding away from the intake 52. A portion of the water emerging from the intake 52 strikes the deflector 94 and flows downward therefrom to the bottom wall 92, then downwardly therealong.

To exit the precipitation chamber 90, the partly cleaned air flows through the second water curtain 83 into an outlet throat 96. The water from the water curtain 83 joins the water 92a flowing down the bottom wall 92 to flow into a pool 95 formed at a deflector 97. The air proceeds at relatively low velocity through this curtain 83, enabling a large percentage of remaining particulate material to be wetted and removed from the air. The air is deflected upwardly toward an upper wall 98 by the deflector 97. It will be appreciated that because there is a thirty five gallon per lineal foot flow of water across the deflector 97 the water will have sufficient momentum to flow upwardly and to the right to hit the wall 98 and form a third water wash at the throat 96. The deflector 97 includes an adjustable baffle 102 projecting toward the upper wall 98. The outlet throat 96 is defined between a downwardly sloping upper wall 98 and a generally parallel lower wall 100. To effect turbulent mixing of air and water in the lower region 106 of the downwardly sloping outlet throat 96, the baffle 102 extends upwardly from the lower wall 100 and defines a slot 104 adjacent the upper wall. The deflector 97 also causes a change in direction of air flow directing the air upwards and to the right as seen in FIG. 3 against the wall 98 which again deflects the air and causes air turbulence at the slot 104. This baffle 102 is preferably adjustable to enable control of the slot width over a range of about 8 to 4 in. The water flowing across the upper edge of the baffle 102 has sufficient inertia to hit the wall 98 as does the air stream and the deflected air and water mix in a highly turbulent fashion to wet paint particles. Because the slot 104 is narrow, the air increases its velocity in a lower region 106 below the outlet throat 96. Thus, there is a turbulent flow of air and water particles and a mixing thereof and wetting of a further percentage of remaining paint particles at the slot 104.

Another final mixing operation is effected after the air and water exit the outlet throat 96 by provision of a relatively narrow outlet slot 108 defined between a pair of transverse walls 110, 112 which extend toward one another at the lower ends of the walls 98, 100. The outlet slot 108 preferably defines the minimum width of the flow path through the air cleaning unit 26, thus accelerating air and water to their highest velocities at this location. Because the slot 108 is relatively remote from the booth interior, the noise resulting from the high velocity flow therethrough does not result in unacceptably high noise levels in the booth. The water from the slot drops downwardly to hit a corner formed at the juncture of the wall 100 and the plate 112 and forms a pool in the corner with water being deflected by the plate 112 upwardly and to the right and across the entrance of this slot 108. Air flowing into this water at the outlet slot 108 lifts water and creates a spray and a turbulent mix of spray and air above the slot 108. Herein, the slot width may be varied by two adjustably mounted plates 111 and 113 each fastened to a transverse wall 110 and 112 and movable toward or from each other to increase or decrease the size of the outlet slot therebetween. Because all of the air and water flowing through one-half of the booth at the slot 108, there will be water and air mixing and flowing in a turbulent manner about the narrow slot 108 with a build-up of static pressure above the slot 108. Thus, the air and water will be mixing in a very turbulent manner in a small space above the slot 108 causing a very high removal of particulates to obtain the extra efficiency not heretofore achieved with these kinds of booths. The water flow across the slot 108 creates a fourth water curtain or wash. While it is difficult to designate which portion of the overall apparatus provides the final increase in removal efficiency, it is thought, based on experimental designs and tests, that the air expansion chambers 90 and 114 on the opposite sides of the turbulence form slot 108 removes paint particles which heretofore would have escaped removal.

As the spray enters the separation chamber 114, its velocity is directed generally downwardly and toward the center of the booth 10. Upon entering the separation chamber 114 it decelerates and changes direction, turning further downward, then left (as seen in FIG. 3) toward the outer wall 116 of the booth, then upwardly into an exhaust duct 118. The separation chamber is very large in volume so that the large water and paint particles will decelerate to 600 feet per minute or less and will drop to the floor 120 which will be covered by water. In the separation chamber 114, gravity, augmented by the momentum of the water and wetted paint particles, causes all but a very small percentage of the water and wetted paint particles to drop to the inclined floor 120 of the separation chamber 114, which is sloped toward a longitudinally extending drainage channel 122 that carries the mixture to water treatment apparatus (not shown).

While the larger water particles precipitate readily, some of the smaller particles tend to remain suspended in the air flowing through the separation chamber 114 in the form of a fine mist. To control the flow of these mist water particles, a first deflector 124 extends downwardly from the lower wall 100 to direct air flow downwardly rather than letting the mist flow through a short direct path to the exhaust duct 118. The forty five gallons per lineal foot of water flowing from the slot 108 creates another or fifth water wash for the air which must change direction to flow to the left and through the fifth water wash before exiting the booth. To further change the direction of air flow and to lengthen the travel path of mist water particles, a second deflector 126 extends upward immediately downstream of the drainage channel 122 to deflect the air and mist upwardly into a very large expansion chamber 115 defined by overhead plates 92 and 100 and a floor plate 121. Thus, the air and mist particles will experience a further reduction in velocity eigi to 400 fpm or less in the chamber 115. A final reduction in the water content of air entering the exhaust duct 118 may be provided by an eliminator 128 at the lower end of the exhaust duct 118. The eliminator 128 comprises a series of horizontal angle irons or plates 129 and 131 spaced closely to one another and arranged in the usual chevron arrangement.

Figure 2:
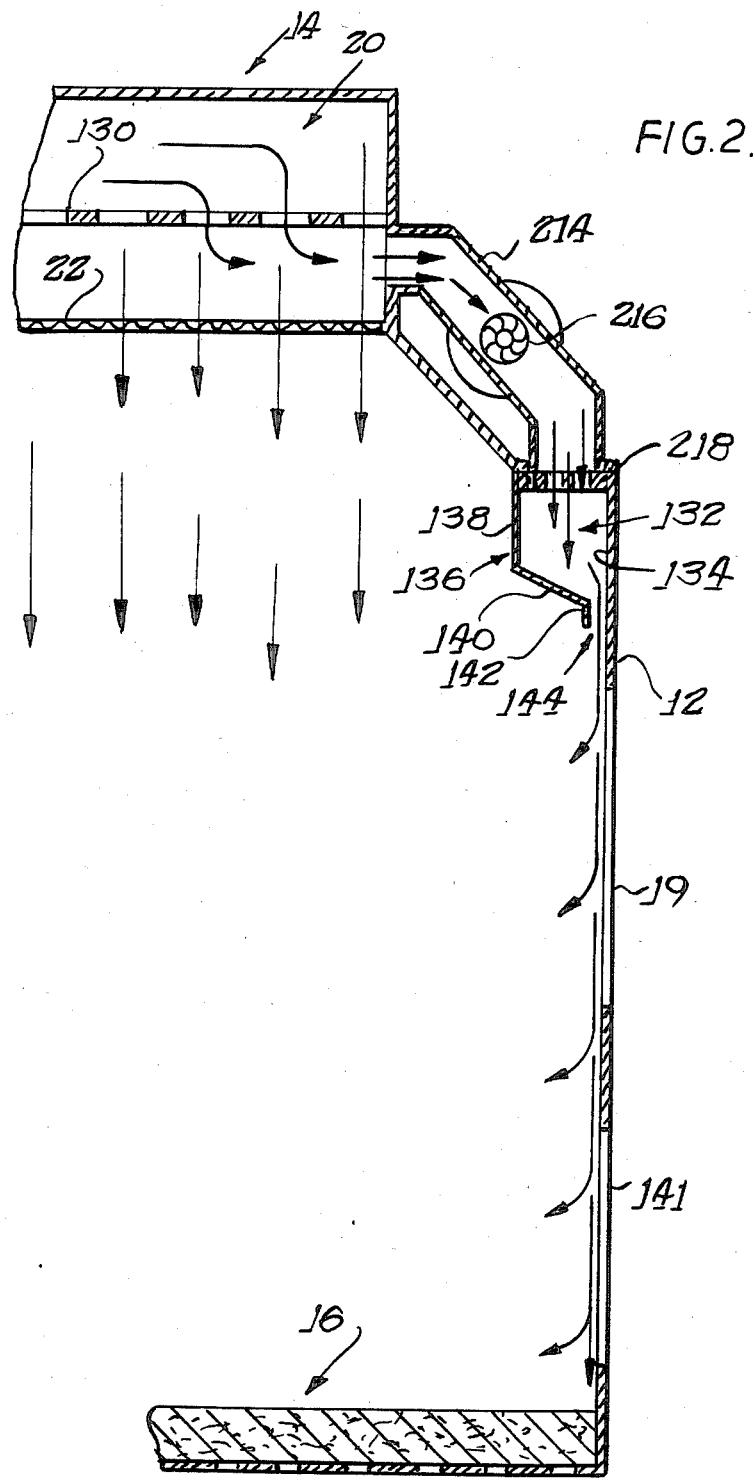
FIG. 2 is an enlarged sectional view taken substantially along line 2—2 in FIG. 1 and looking in the direction of the arrows.

Turning to a description of air flow in the interior of the booth 10, and referring particularly to FIGS. 1 and 2, air is introduced into the booth from the large ceiling plenum 20, which is located above the permeable ceiling assembly 22 and coextensive therewith, and a pair of elongated side plenums 132 extending along the upper ends of the respective side walls 12. A substantially horizontal filter layer 130 coextensive with the permeable ceiling assembly 22 and parallel thereto is disposed within the ceiling plenum 20. Air enters the ceiling plenum 20 through ducts or openings above the filter layer 130 and passes downward through the filter layer 130 prior to passing through the ceiling assembly 22. The air in the ceiling plenum 20 is maintained at generally uniform pressure so that generally uniform downward air velocity results.

Curtains of relatively high velocity, downwardly flowing air are provided by the by the side plenums 132 to aid in keeping the side walls 12 of the booth clean. Each of the side plenums 132 has an outer wall 134 (FIG. 2) defined by the uppermost portion of the booth side wall, and has an inner wall 136 which extends downwardly from the roof assembly 14 and includes a vertical upper portion 138 and a lower portion 140 which slopes downward toward the side wall 12 of the booth. At the bottom of the sloping portion 140 is provided a substantially vertical lip 142 which is parallel to the side wall 12 of the booth and spaced therefrom to define a relatively narrow passage or throat 144. As air emerges from this passage 144, it has a relatively high downward velocity component which enables it to prevent particles from adhering to the interiors of the side walls 12. The average velocity of air in the air curtains is preferably greater than the average velocity of air flowing downward through the ceiling assembly 22 into the interior of the booth 10.

In prior art booths, the provision of a single, central air intake located centrally at the conveyor track caused air to flow inwardly to a single slot located directly beneath the conveyor and hence influenced the flow of air about the articles on the conveyor. This may interfer with uniform application of paint. The provision of dual intakes 52 beneath the floor of the booth of the present invention, in combination with the provision of air curtains along interiors of the side walls 12, results in relatively uniform downward flow of air without undesirable adherence of paint particles to the interiors of the side walls 12.

While the bulk of the air in booth flows directly down from the ceiling plenum 20 through the pervious floor 16, some of the air in the ceiling plenum is diverted to the sides of the booth to provide a supply of clean air for the air curtains. Herein, blowers 216 effect flow of air from the ceiling plenum 20 beneath the filter layer 130 through ducts 214 into the side plenums 132. The ducts 214 are located outside of the booth 10 so as not to interfere with airflow therein. To aid in uniform distribution of air emerging from the ducts 214, filters 218 are provided at the outlets of the ducts. Thus, the windows 141 and the lights 143 for illuminating the articles being painted are protected from being covered by paint thereby reudcing the booth maintenance cost for cleaning the windows and lights.

Figure 4:
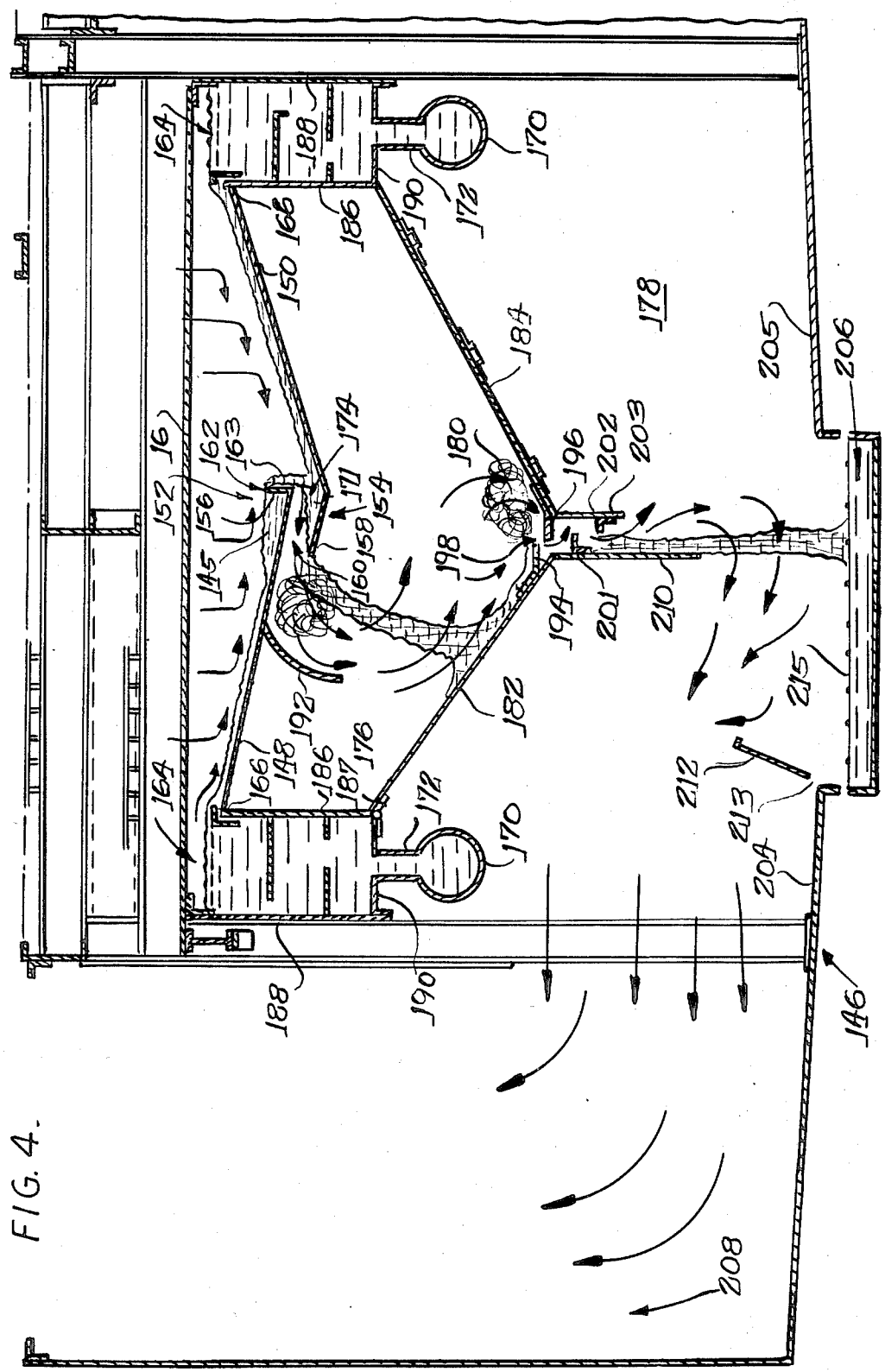
FIG. 4 is a sectional view illustrating air cleaning apparatus in accordance with a second embodiment of the invention.

FIG. 4 illustrates an air cleaning unit 146 in accordance with a second embodiment of the invention. The air cleaning unit 146 can be substituted for the air cleaning unit 26 in the booth illustrated in FIG. 1.

Like the air cleaning unit 26 described above, the unit 146 of FIG. 4 includes upper and lower subfloor members 148 and 150 which slope downwardly toward one another and include means 152 and 154 to provide for retention of water to form large pools of water to flow over their lower edges 156 and 158. A generally horizontal intake 160 is defined between lower portions of the subfloor members 148 and 150. The intake 160 of the unit 146 of FIG. 4 functions in substantially the same manner as that in FIG. 3. As in the embodiment of FIG. 3, an adjustable weir 162 retains a water pool near the lower edge of the upper subfloor member 148 while defining a slot 174 to restrict flow into the intake. Flow of water over the weir 162 provides a first water curtain 163 across the slot 174.

As in the embodiment of FIG. 3, reservoirs 164 are provided at the upper edges 166 of the subfloor members 148 and 150 and supply pipes 170 provide water to the reservoirs. Each reservoir is defined by a pair of vertical walls 186 and 188 and a bottom wall 190 extending therebetween. In the embodiment of FIG. 4, the supply pipes 170 are disposed beneath the respective reservoirs 164 and connected thereto by a plurality of relatively short distributor pipes 172, rather than being submerged in the reservoirs. Thus, the entire surfaces of the subfloors 148 and 152 will be wetted and have a continuous flow of water thereacross to prevent paint from accumulating thereon; and large water pools 145 and 171 assure that entire longitudinal length of each of the edges subfloor is wetted and covered with a flow of water thereacross at all times that the booth is operating. About twenty gallons per lineal foot of water flows over the weir 162 to form a first water wash for the air which is deflected from a downward flow to flow to the left and horizontally in FIG. 4.

A precipitation chamber 176 of large volume receives the high velocity flow of air and water particles from the intake slot and dramatically reduces the air velocity, e.g., from about 4000 fpm at the slot to about 600 fpm in the chamber 176. In the precipitation chamber, some paint particles wetted in the intake 160 precipitate from the air due to the low flow velocity. Air and water entering the precipitation chamber 176 flows downward and to the left as viewed in FIG. 4. Approximately 45 gallons per lineal foot flow down from the intake slot to define the second water wash 181. The horizontal component of the average air flow velocity then reverses direction, which aids in separation of heavy wetted particles from the flow stream, and proceeds at relatively low velocity through the second water curtain 181 before entering the outlet throat 180.

The precipitation chamber 176 and outlet throat 180 of the embodiment of FIG. 4 are configured differently from those illustrated in FIGS. 1 and 3. The precipitation chamber 176 in the embodiment of FIG. 4 is larger, being defined by a pair of downwardly sloping, converging walls 182 and 184 located beneath and generally coextensive with the subfloor members 148 and 150. The sloping walls 182 and 184 are connected to the subfloor members by vertical reservoir walls 186. A curved deflector 192 extends downwardly into the precipitation chamber 176 from the bottom of the upper subfloor member 148 adjacent the intake 160.

One of the sloping walls 182 is pivotally connected to its associated vertical wall 186 by a hinge 187. This enables the wall 182 to swing downward to provide convenient access to the interior of the precipitation chamber 176 for inspection and cleaning purposes.

Near the lower edges of the sloping walls 182 and 184 are baffles 194 and 196 defining a relatively narrow slot 198 at the entrance to the outlet throat 180. Each of the baffles 194, 196 comprises an angle iron having its webs joined at an angle greater than 90°, so that one web of each baffle lies flat against one of the sloping walls so as to be supported thereby and the other web of each baffle extends substantially horizontally inward.

To enable the baffles 194 and 196 to be adjusted between positions in overlapping relation wherein they define a narrow passage and positions defining a wider passage, they are slidable upwardly and downwardly on their respective sloping walls 182 and 184. When in overlapping relation, fluid flow into the outlet throat undergoes two sharp changes in direction of greater than 90°. The passage defined between the baffles 194 and 196 when they are in overlapping relation may have a minimum width as small as 2 to 4 in. in this position. Approximately, forty five gallons per lineal foot of water flows across the top of the baffle plate 194 and continues generally horizontally across a gap, before hitting the baffle plate 196; and creates a third water wash thru which the air must flow before it can flow between the parallel baffles 194 and 196. The air coming from the expansion chamber is flowing down and to the right to hit the wall 184, the air is deflected at the wall 184 to change direction to flow to the left and horizontally between the baffles 194 and 196. Accordingly, the large volume of water particles and air all changing directions and trying to flow simultaneously between the baffles 194 and 196 are deflected in so many different and intersecting directions that there is a highly turbulent mixing which effects wetting of particles that remain suspended in the air after passing through the precipitation chamber 176.

Downstream of the baffles, the outlet throat 180 comprises a pair of substantially vertical walls 200 and 202 disposed about 4 in. apart which assures a relatively high velocity for the air flowing through the throat. To increase turbulence and mixing in the outlet throat 180, horizontal baffles 201 and 203 project inwardly from walls 200 and 202.

The baffles 201 and 203 are preferably angle irons which are disposed at vertically offset elevations. To effect repeated reversal of the horizontal velocity component of the flow into and through the throat, the baffles 194, 196, 201 and 203 project alternately from left and right into the outlet throat. That is, the uppermost baffle 194 projects from the left; the second baffle 196 projects from the right; the third baffle 201 projects from the left; and the lowermost baffle 203 projects from the right. Accordingly, as water flows across the top of the baffle 194, it will strike the vertical wall 200 and changes its direction and flow downwardly onto the top surface of the baffle 201 which deflects the water generally horizontally across a small gap to hit the right hand vertical wall 202. This water flowing across this gap constitutes a fourth water wash. The air flowing to left between the baffles 194 and 196 is also deflected by the left wall 200 to reverse its direction of flow and the air then is caused by the right hand vertical wall to flow downward through the fourth water wash formed by the baffle 201. Similarly, the water flowing from the fourth water wash flows down along the right vertical wall 202 to hit the top surface of the baffle 203 projecting outwardly and horizontally from the right vertical wall 202. The baffle 203 deflects the water to change its direction of flow to the left to form a fifth water wash across the gap between the left edge of the baffle 203 and the left vertical wall 200. The latter deflects the water which then flows down through the gap. The air is likewise reversed from a horizontal rightward flow to a leftward horizontal flow and the air is deflected downward to flow through the fifth water wash at the gap between the baffle 203 and the left vertical wall 200. Because of the high velocity of air flow through third, fourth and fifth water washes at these baffles, and the rapid changes in flow direction for the water and air, much of the water becomes spray particles and is so mixed with the air so as to wet substantially all of the paint particles being carried by the air.

After mixing takes place in the outlet throat 180, air and water flow generally downwardly into the separation chamber 178 which has a very large volume and causes the air leaving the throat to drop very substantially in velocity, e.g. to 400 fpm or less at which the paint and most of the water particles drop out of the air. Thus, all but a small percentage of the wetted paint particles and water particles fall to the floor 204 of the separation chamber 178 and into a drainage channel 206 which is shown in FIG. 3. To prevent development of flow patterns which might carry mist, i.e. very fine water particles to the exhaust duct 208, a deflector 210 extends substantially vertically downward from one side of the outlet throat 180. The deflector 210 is preferably contiguous with, and may be integral with, the vertical wall 200. The 210 deflector forces water particles to flow downwardly around its lower edge so that their momentum augments gravitational forces in directing them into the drainage channel 206, rather than permitting them to pass to the exhaust duct 208.

To further increase the distance, mist particles must travel to exhaust and to cause the mist particles to change direction and remain for a longer time in the separation chamber, there is provided a second deflector 212 extending upwardly from the floor 204 of the separation chamber immediately downstream of the drainage channel 206. The deflector 212 has its lower edge 213 spaced above the floor 204 to allow water flowing across the inclined floor to carry paint particles into the drainage channel 206. The illustrated channel 206 is substantially deeper than usual so that the surface 215 of the water in the tank is substantially below the inclined floors 204 and 205. Thus, air flowing across the right hand floor 205 will not pick up water from the surface 215 of the water in the channel 206. Because of the high volume of water flow and because of the inward slope of both the bottom floors 204 and 205 into the drainage channel, the wetted paint particles will be washed from the floors and be accumulated in the drainage channel and the cleaning of the floors will be alleviated. As in the embodiment of FIG. 3, eliminators (not shown in FIG. 4) may be provided in the exhaust duct to remove fine particles or mist from the air. FIG. 4 illustrates only the left half of the air handling equipment and a second right hand half thereof of mirror image construction is provided, as shown in the first embodiment of the invention, in FIG. 1.

To review briefly the flow through the air cleaning unit of FIG. 4, the subfloors 148 and 150 are continually wetted by water flowing over the adjustable weirs to form large pools of water 145 and 171 at the lower edges of the subfloors. These pools assure a continuous uninterrupted water flow, preferably at 20 and 15 gallons per lineal foot across their lower edges to form waterfall types of water washes. Air is deflected horizontally flow through the first waterfall water wash 163 and then flows through the intake 160 generally horizontally, and then flows generally downwardly and to the left as viewed in FIG. 4 into the precipitation chamber 176. In the precipitation chamber 176, air velocity drops substantially e.g. from 4000 fpm through the slot to 600 or 800 fpm and the horizontal component of the average flow velocity reverses direction, and the air flows downwardly to the right, through the second water curtain 181. The water flows to the right across the top of the baffle 194 and creates the third water curtain as it drops down onto the top of the baffle 196. The air having passed through the second water curtain and flowing downwardly and to the right hits the wall 184 and the tops of the baffle plates 194 and 196 and flows through the third water curtain at the slot 198. Thus, the air and water are deflected and mixed and the air increases in velocity flowing through the slot 198 and there is a large static pressure build-up is caused at the throat due to small size thereof. The air velocity in the throat increases very substantially. The air and water flowing to the left through the slot hit the left vertical wall 200 and are deflected to cause a turbulent air and water mix. The air flows down and reverses in direction to flow to right over the top of the baffle 200. The water flowing over the right edge of the baffle 200 creates a fourth water curtain and air must reverse its direction and flow down through the fourth water curtain before hitting the left vertical wall 200. The water also hits the vertical wall 200 and flows down therealong to create a sixth water curtain as the water drops therefrom into the underlying deep drainage channel 206. The air in the right hand portion of the separation chamber drops quickly in velocity from several thousand fpm to about 400 fpm. The volume of the chamber 178 is huge so the air drops in velocity to less than the carrying velocity for wetted paint or large water particles, e.g. to a velocity of less than 400 fpm. The air in the right hand portion of the separation chamber flows through the sixth water curtain before flowing across the top of drainage channel. Because the water level or surface 215 may be about a foot or so below the floors 204 and 205, the air flowing over the channel does not pick up more water. The deflector 212 deflects the air upwardly to assure that water entrain from the sixth water curtain is not carried out within the air stream that flows into the exhaust duct 208. In the embodiment of FIG. 4, an eliminator is not provided in the exhaust duct although one may be provided if it is thought to be desirable.

The air cleaning unit of FIG. 4 has been found to be capable of removing over 99% of particulate matter from air during simulated industrial painting use. The combination of change of air flow directions and of the highly turbulent mixing of air and water in the intake 160 and the outlet throat 180, with the slower, less turbulent flow in the precipitation chamber 176 and separation chamber 178 is responsible for the high performance of the unit of FIG. 4. Also partially responsible is the configuration of the outlet throat 180. To achieve optimal performance, the slot widths should be adjusted to particular values determined by parameters such as the particle concentration, the air flow rate, and the water flow rate. The independent adjustability of the widths of the slots 174 and 198 enables the unit 126 to be "tuned" to compensate for variation in these parameters.

FIG. 4 illustrates the preferred embodiment of the invention which has been tested by an independent testing company at very high rates of paint flow such as about 97 lbs of paint being sprayed per hour in a ten foot spray booth. The outlet lbs/hr. of paint particles averaged only 0.27 lbs/hour with an air flow rate of about 10,400 cfm.

From the foregoing, it will be appreciated that the invention provides a novel and improved paint spray booth. The invention is not limited to the embodiment described above or any particular embodiments.

What is claimed is:

1. A spray booth comprising:
   first and second upstanding side walls defining an interior spray area therebetween;
   an air permeable floor extending between the side walls and beneath the interior spray area of booth;
   air cleaning apparatus disposed beneath the floor comprising a pair of air cleaning units, each unit extending the length of the booth and defining an interior flow path of varying cross-sectional area, at least one of said units comprising:
   a pair of subfloor members comprising an upper member and a lower member sloping downwardly toward one another, the lower member extending partially beneath the upper member to define a generally horizontal intake of relatively small cross-sectional area extending the length of the spray booth to provide a predetermined velocity air flow through said intake;
   water supply means for effecting flow of water over the subfloor members and across the intake to wet particles flowing with the air through the intake;
   a precipitation chamber disposed at least partially beneath the upper subfloor member for receiving flow from the intake, the precipitation chamber having a substantially larger cross-sectional area than the intake to lower substantially the velocity of the air flow therein from the air predetermined velocity at the air intake;
   means providing another turbulent water wash for paint particles and having a second slot through which the air passes at a velocity higher than the air velocity in the precipitation chamber, an enlarged second chamber to slow down the air,
   means defining an outlet slot for receiving flow from the second chamber, the outlet slot being disposed at a lower elevation than the intake, and having a substantially less cross-sectional area than said precipitation chamber causing an increase in static pressure, means adjacent the outlet slot for directing the air into a turbulent flow above the outlet slot,
   a separation chamber for receiving flow from the outlet slot and having a cross-sectional area substantially larger than the area of said outlet slot to reduce the air flow velocity to cause the particles to drop out, the separation chamber including exhaust duct means for exhaust of air, and water outlet means for outflow of water separately from the air;
   and water eliminator means located after the separation chamber to further reduce water particles to substantially zero percentage to exhaust substantially dry air, and
   blower means for drawing air downwardly through the interior of the booth and through each air cleaning unit;
   the blower means cooperating with each air cleaning unit to provide in each unit turbulent blow in the intake to effect wetting of particles carried by the air, relatively low velocity flow in the precipitation chamber to effect precipitation of wetted particles, relatively high velocity turbulent flow in the second slot and the outlet throat to effect further wetting of particles, and relatively low velocity flow through the second chamber and the separation chamber to permit further precipitation of wetted particles and water particles and separation of air from wetted paint particles and water.

2. A spray booth in accordance with claim 1 wherein each of the air cleaning units has means so that the horizontal component of the average velocity of air flowing therethrough reverses direction in the precipitation chamber and again reverses direction in the separation chamber.

3. A spray booth in accordance with claim 1 wherein the outlet slot is of adjustable width.

4. A spray booth in accordance with claim 1 wherein each air cleaning unit further comprises a deflector extending downwardly beneath the upper subfloor portion within the precipitation chamber to downwardly deflect air flow emerging from the intake.

5. A spray booth in accordance with claim 2 wherein each air cleaning unit further comprises deflector means extending downward beneath the lower subfloor member within the precipitation chamber adjacent the intake to downwardly deflect flow emerging from the intake.

6. A spray booth in accordance with claim 1 wherein each of subfloor members in each of the air cleaning units includes a large, generally planar sloping portion having a substantially horizontal upper edge and a substantially horizontal lower edge, and means for retaining water adjacent its lower edge; and wherein the water supply means for each air cleaning unit includes a pair of elongated reservoirs, one extending adjacent the upper edge of each of the subfloor members, and water supply means for inflow of water into each of the reservoirs below the upper edge of the associated respective one of the first pair of subfloor members.

7. A spray booth in accordance with claim 3 wherein each air cleaning unit further comprises means defining an intake slot restricting entry to the intake.

8. A spray booth in accordance with claim 7 wherein each of the intake slots is of variable width.

9. A spray booth in accordance with claim 8 wherein the width of each of the intake slots is variable independently of the slots of the outlet throat.

10. A spray booth in accordance with claim 8 wherein in each air cleaning unit, the means defining the intake slot comprises a vertically movable weir extending the length of the lower edge of the upper subfloor member and functions to maintain a pool of water adjacent the lower edge of the upper subfloor member as well as to restrict flow into the intake.

11. A spray booth in accordance with claim 8 wherein the width of the intake slot of each unit is variable from about 2 in. to about 4 in.

12. A spray booth in accordance with claim 11 wherein the width of at least one of the slots in the outlet throat of each unit is variable from about 2 in. to about 4 in.

13. A spray booth in accordance with claim 12 wherein the blower means draws air through each unit at a volume flow rate of about 1,000 cfm per foot, and the water supply means effects flow of water through each unit at a rate of about 30 gal. per minute per foot.

14. A spray booth in accordance with claim 1 further comprising first air supply means for providing generally uniform downward flow of air through the booth, and second air supply means providing air curtains along the interiors of the side walls of the booth to reduce adherence of particulate matter thereto.

15. A spray booth comprising:
first and second upstanding side walls defining an interior spray area therebetween;
an air permeable floor extending between the side walls beneath the interior spray area of the booth;
air cleaning apparatus disposed beneath the floor comprising at least one air cleaning unit, each air cleaning unit comprising:
a pair of subfloor members comprising an upper member and a lower member sloping downwardly toward one another, the lower member extending partially beneath the upper member to define a generally horizontal intake extending the length of the spray booth, the upper member and the lower member being relatively closely spaced so that the intake has a relatively small cross-sectional area;
water supply means for effecting flow of water over the subfloor members into the intake;
a preciptation chamber disposed at least partially beneath the upper subfloor member for receiving flow from the intake, the precipitation chamber having larger cross-sectional area than the intake;
means defining an outlet throat for receiving flow from the precipitation chamber, the outlet throat being disposed at a lower elevation thatn the intake, the outlet throat comprising at least two relatively narrow slots, one located downstream from the other, separated by a flow passage of larger cross-sectional area than the slots; and a separation chamber for receiving flow from the outlet throat, the separation chamber including exhaust duct means for exhaust of air,
water eliminator means located after the separation chamber to further reduce the water particles in the exhaust air to exhaust substantially dry air and water outlet means for outflow of water separately from the air; and
blower means for drawing air downwardly through the interiorly of the booth and through the intake, through the precipitation chamber, through the outlet throat, and through the separation chamber of each air cleaning unit;
the blower means effecting relatively high velocity, turbulent flow in the intake to effect wetting of paint particles carried by the air, relatively low velocity flow in the precipitation chamber to effect precipitation of wetted paint particles, relatively high velocity turbulent flow in the outlet throat to effect further wetting of paint particles, and relatively low velocity flow through the collection chamber to permit further precipitation of wetted paint particles and separation of air from wetted paint particles and water;
whereby a flow path of varying cross-sectional area is defined through each air cleaning unit;
one of the slots in the outlet throat of each unit defining the minimum cross-sectional area for the flow path through the unit.

16. A spray booth comprising:
first and second upstanding side walls defining an interior therebetween;
a ceiling spanning the interior of the booth and having a central air-permeable portion extending substantially the entire length of the booth;
a ceiling plenum disposed above the ceiling;
an inlet for clean air disposed above the ceiling in communication with the plenum;
an air-permeable floor extending between the side walls beneath said ceiling;
means for inducing flow of air from said ceiling plenum through the ceiling and downward through the booth interior at a first predetermined average flow velocity;
air curtain means for providing downward air flow along interior surfaces of the side walls at an average velocity greater than said first predetermined average flow velocity, said air curtain means including a pair of elongated side plenums, one extending along an upper portion of each of the side walls adjacent the ceiling, and means for introducing air into the side plenums to provide relatively high air pressure within the side plenums, each side plenum having an outlet means extending along the bottom thereof to enable downward flow of air therefrom at an average velocity greater than said predetermined velocity.

17. A spray booth in accordance with claim 16 wherein the air curtain means comprises a pair of elongated side plenums, one extending along an upper portion of each of the side walls adjacent the ceiling, and means for introducing air into the side plenums to provide relatively high air pressure within the side plenums, each side plenum having an outlet means extending along the bottom thereof to enable downward flow of air therefrom at relatively high velocity.

18. A spray booth in accordance with claim 17 further comprising a generally horizontal filter layer disposed between the ceiling and the inlet and a plurality of ducts carrying air from beneath the filter layer to the side plenums.

19. A spray booth in accordance with claim 18 wherein each of the outlet means in each of the side plenums includes a substantially planar lip disposed substantially parallel to the respective adjacent side wall and spaced therefrom so that air flows downward between the lip and the side wall out of the plenum.

20. In a bottom draft spray booth, the combination for removing air borne particles comprising:

walls defining a interior spray area, an air permeable floor beneath the spray area with air carrying particulates through the floor.

a pair of sloping subfloors sloping toward each other and defining an air slot therebetween, means for directing water to flow across the air slot to form a first water curtain through which the air must flow so that particulates are wetted in the first water curtain, walls defining the slot causing the air velocity to increase substantially when flowing through the slot, a precipitation chamber having a substantially larger area than said slot to reduce substantially the velocity of the entering air from the slot, means in the precipitation chamber to change the direction of air and water flow, means creating a second water curtain through which the changed direction air flows to again wet particulates, baffle means creating a third water curtain below the separation chamber and a second air slot, means for deflecting the air and water to change their respective directions of flow before air flows through the second air slot to cause air and water turbulence to wet particulates, baffle means creating a third slot and for directing water across the slot to form a fourth water curtain across the third slot, means to deflect the air to change its direction of flow before the third slot to cause air and water turbulence to form a spray through which the air passes before flowing through said fourth water curtain and the third slot,.

means defining a fifth water curtain through which the air must flow, a precipitation chamber of substantially greater area than the third slot to drop substantially the velocity of the air borne particulates and of the air flowing in to the precipitation chamber, and exhaust means for exhausting the air cleaned of particulates from the spray booth.

21. A spray booth in accordance with claim 20 including a sixth water curtain in the precipitation chamber formed by water flowing from the fifth water curtain.

22. A spray booth in accordance with claim 20 in which the fifth water curtain is formed in the precipitation chamber.

23. A spray booth in accordance with claim 20 in which a central deep drainage channel is formed beneath the floor of the booth, the deep drainage channel having sufficient depth to keep the water surface well below the floor so that the air will not lift water from the channel.

* * * * *

UNITED STATES PATENT AND TRADEMARK OFFICE
CERTIFICATE OF CORRECTION

PATENT NO. : 4,700,615

DATED : October 20, 1987

INVENTOR(S) : Stanley C. Napadow

It is certified that error appears in the above-identified patent and that said Letters Patent is hereby corrected as shown below:

Column 6, Line 36, Change "downardly" to --downwardly--.

Column 8, Line 26, Change "eigi" to --e.g.--.

Column 8, Line 50, After "by the" (first occurrence) delete --by the" (second occurrence).

Column 9, Line 5, Change "interfer" to --interfere--.

Column 9, Line 26, Change "reudcing" to --reducing--.

Column 12, Line 51, After "build-up" insert --which--.

Column 13, Line 11, Change "exhust" to --exhaust--.

Column 14, Line 33, Change "blow" to --flow--.

Column 15, Line 64, Change "thatn" to --than--.

Column 16, Line 10, Change "interiorly" to --interior--.

UNITED STATES PATENT AND TRADEMARK OFFICE
CERTIFICATE OF CORRECTION

PATENT NO. : 4,700,615

DATED : October 20, 1987

INVENTOR(S) : Stanley C. Napadow

It is certified that error appears in the above-identified patent and that said Letters Patent is hereby corrected as shown below:

Column 17, Line 12, Change "a" to --an--.

Column 17, Line 14, After "floor" change period to comma.

Signed and Sealed this

Fifth Day of April, 1988

Attest:

DONALD J. QUIGG

*Attesting Officer*  *Commissioner of Patents and Trademarks*